Oct. 21, 1969
J. H. REDMAN
3,474,445
DISPLAY TUBES AND SYSTEMS
Filed July 11, 1967
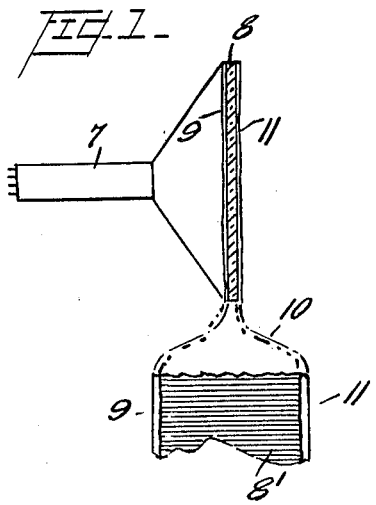
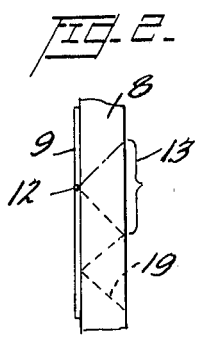
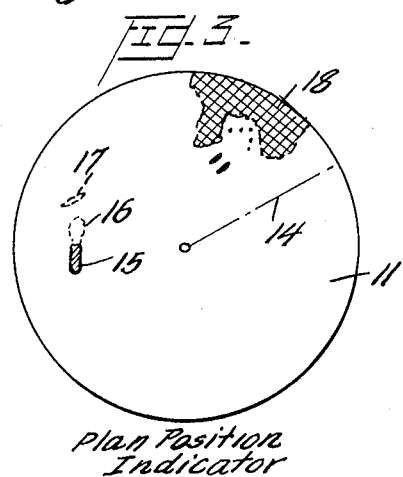
Plan Position Indicator
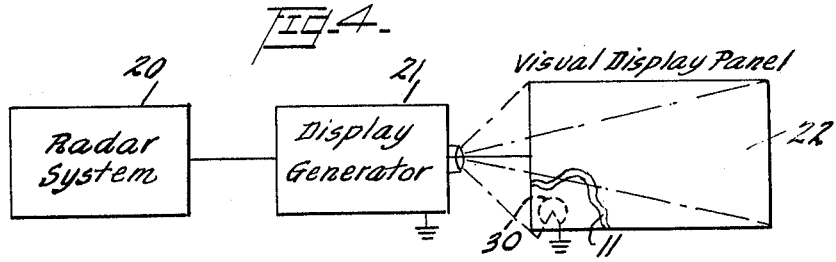
INVENTOR.
BY *James H. Redman,*
*Lawrence R. Brown*
ATTORNEY

United States Patent Office 3,474,445
Patented Oct. 21, 1969

3,474,445
DISPLAY TUBES AND SYSTEMS
James H. Redman, San Diego, Calif., assignor to Stromberg-Carlson Corporation, Rochester, N.Y.
Filed July 11, 1967, Ser. No. 652,613
Int. Cl. G01s 9/42
U.S. Cl. 343—7.7       15 Claims

ABSTRACT OF THE DISCLOSURE

A visual display one embodiment of which comprises a cathode ray tube with an optical fiber glass faceplate used in conjunction with a reversible light sensitive material to constitute a display panel which temporarily stores recurrent flashes of light generated by the cathode ray tube in response to radar or sonar system signals, or the like. In other embodiments the light image may be projected, or the panel may comprise discrete light-emitting dots in a pattern. In this manner either undesired stationary signals may be reduced or a historical record of recent position changes may be displayed.

---

This invention relates to visual displays and, more particularly, it relates to visual displays which differentiate between stationary and moving objects.

Although it has been desirable to distinguish between current and historical data displayed, for example, upon a cathode ray tube by a televison or radar system, apparatus for accomplishing this in the past has been complex and has presented serious deficiencies in operation.

For example, a radar system may be adapted to distinguish between moving and stationary objects in accordance with prior art techniques by providing complex electronic equipment including electronic memories to hold or cancel signals after predetermined time periods before display. Not only is the cost and necessity to change existing systems inconvenient, but these systems usually result in the loss of some of the signals so that the complete moving and stationary information is not available at the same time.

Systems have been devised for manual plotting of historic data upon a plotting sheet overlaying the display screen, as proposed in the Freedman et al. Patent 2,853,701. However, this requires manpower and is subject to human interpretations and possible error. Extensions of this concept into automatic systems as evidenced by White Patent 2,668,286 and Sharpe Patent 2,440,301 have required specialized cathode ray tubes with multiple phosphor layers and specialized electronic control equipment therefor. Such multiple phosphor layers require expensive and critical special techniques for tube construction and operation. Furthermore, these displays are not well adapted for projection upon large centrally visible display panels, and are useful only when cathode ray tubes are employed in the display system. Life of such devices is also short since a delicate operational balance must be maintained and when failure occurs neither phosphor can be replaced independently.

It is an object of the present invention to produce improved, simplified and effective means to differentiate between stationary and moving objects presented upon periodically recurring display panels.

It is another object of the invention to reduce the prominency of unchanging data on display panels, thereby to render changing data more prominent.

It is another object of the invention to produce means for identifying both stationary and moving objects without requiring operational changes in electronic display systems such as radar systems, and furthermore not requiring specialized non-conventional display panels such as cathode ray tubes with complex and critical operational characteristics.

A still further object of the invention is to provide means for universally differentiating between historic and current information on various types of display panels with cyclically recurring data.

Therefore, in accordance with this invention at least one layer of reversible light sensitive material is interposed as a memory device between a conventional display panel such as a cathode ray tube or a translucent projection screen and the observer without requiring any alteration in the electronic system or the operational characteristics. A preferred embodiment of the invention includes a cathode ray tube which has a fiber optic faceplate interposed between the phosphor on the interior surface of the tube and a light sensitive dye layer on the exterior surface of the tube.

Further features, objectives and embodiments of the invention are described with particularity in the following specification, with reference to the accompanying drawings, wherein:

FIGURE 1 is a diagrammatic view of a cathode ray tube embodiment of the invention;

FIGURE 2 is a light ray pattern illustrating operational features of the invention;

FIGURE 3 is a plan view of a typical display panel operable in accordance with the invention; and FIGURE 4 is a block diagram representation of a radar system incorporating the invention.

The cathode ray tube 7 shown in FIGURE 1 is conventional in form with faceplate 8 having a phosphor layer 9 on its interior surface. It is preferably a tube with a fiber optic faceplate 8' as shown by the exploded section of a faceplate encompassed by the brackets 10. In accordance with this invention the outer surface of the faceplate 8 is covered with a film or masking layer 11 comprising a reversible light responsive material, such as a photochromic dye or a tenebrescent mineral.

This dye layer 11 is of a generally transparent substance in its non-excited state that reversibly reacts to the presence of light to provide in its excited state a relatively opaque or colored surface. The time constant of excitation should be several times that of the phosphor 9 and should respond to a cyclic scanning pattern over the faceplate to become excited only when repetitively lighted over several cycles, say ten.

Since the coloration of the dye layer increases with increased exposure time, the opacity of the respective areas on the masking layer is an inverse function of the rate of motion of the respective exciting light flashes across the display panel. The light intensity from static flashes is thus attenuated and temporary records of the past locations and velocities of moving flashes are provided.

As shown in FIGURE 2, an excited spot 12 on the phosphor 9 may have a diffused path influencing the much larger area 13 on the opposite or outside surface of the glass faceplate 8. Furthermore, rays 19 may be reflected off the glass surfaces to further disperse light from the spot 12. Accordingly, a significant improvement in definition is achieved by use of the fiber-optic faceplate 8' where the light transmission is confined in area as it impinges on masking layer 11 by the tiny parallel glass fibers to substantially the same area as on the phosphor surface 9. In many applications, sufficient definition to be practical and useful can be obtained only if the fiber optics faceplate is used.

The faceplate of the tube is a fused bundle of optical glass fibers. The diameter of the individual fibers is typically 20 microns (0.0008 inch). Each fiber is typically 0.20 inch long, and is composed of two or three optical glasses having different indices of refraction. The glass core of the fiber, which is surrounded by one or two concentric cylinders of cladding glass, has a high index of refraction as compared with that of the first cladding. The second cladding glass, when used, also has a relatively high index of refraction, and contains a colorant to increase the attenuation of light rays through it.

The transmission of light through the fibers is achived by multiple total internal reflection. This phenomenon is characteristic of light rays incident at greater than the critical angle on an interface of transparent media of different indices of refraction. Those rays incident at less than the critical angle are partially reflected and refracted. The partially refracted rays are lost and are considered noise or "cross talk." The role of the second cladding glass is to minimize "cross talk" between adjacent fibers by absorption.

All rays incident on the interface of the core and first cladding layer at greater than the critical angle emerge in a cone determined by the indices of refraction of these media.

Comparisons of conventional lens systems with fiber optics systems show that the latter provide an increase of more than 20 times the image brightness. In addition, nonuniformities of image illumination caused by lens limitations such as vignetting can be entirely eliminated with fiber optics.

It should be pointed out that a fiber bundle is incapable of forming an image as a lens or mirror; however, when an image is formed at one end of a fiber bundle, the image will appear at the other end. This property is utilized to transport the light image in the phosphor to the external surface.

In this system the phosphor 9 is in intimate contact with one end of the fiber bundle 8'. The reversible light responsive material 11 is in intimate contact with the other end of the fiber bundle.

Whenever a spot of light on the phosphor surface 9 is repeatedly scanned, it will excite a more or less opaque or masking spot at a corresponding location in the masking layer 11 depending upon the length of time it has been radiated by the recurring phosphor light spot. In some cases the opacity phenomena in layer 11 should have a relatively fast decay time constant and a relatively slow excitation time constant so that the display is suitable for a radar screen of a fast moving aircraft, for example, where the scene is changing rapidly and a current view of stationary objects is desirable.

With this construction, a display as shown in FIGURE 3 might be obtained on the plan position indicator of a radar system incorporating the external masking layer 11. Thus, a conventional radial sweep 14 generates a map with (1) certain dark areas 15 representative of slowly moving ships, for example, where current lighted positions 16 are merged in to complete the target displays for the ships, (2) fast moving objects as planes providing lighted spots 17 not recurring long enough to provide an apaque historical indication, and (3) permanent obstacles such as islands represented by very dark or opaque areas such as the cross hatched section 18. Other display geometry may be used to indicate the positions of objects, such as where the panel is a line (one dimensional) or where the two dimensions represent any two of the following relative or absolute position parameters: Range, Azimuth Angle, Elevation Angle, Lateral Displacement, Longitudinal Displacement or Vertical Displacement.

The masking layer of the display panel is not limited to the outer surface of the cathode ray tube but may be used inside the tube in a layer substantially parallel and nearby the phosphor or may be used in a projection type radar system signified by FIGURE 4. In this system neither the radar system 20 nor the projection display generator 21 need be changed from its conventional form to produce historical progress upon the large panel type screen 22. The reversible light sensitive dye layer or layers 11 is or are merely superimposed upon the display panel 22 to provide the historical record. The panel may comprise a series of light sensitive layers of different time responses of different colors or filtering properties for example, to show a fast moving aircraft as red while a slower moving object such as a ship would be yellow. The layers 11 may be superimposed by sealing or cementing them in place or they may be removably positioned in a frame for optional use depending upon the circumstances being encountered.

The cathode ray tube 7 with its phosphor 9 and fiber optics faceplace may be replaced by a panel consisting of a multiplicity of discrete electrically energized light emitting devices arranged in a two dimensional ordered array. The devices may be glow discharge lamps, light emitting diodes, or segments of an electroluminescent panel as illustrated by lamp 30. In this embodiment the layer of reversible light sensitive material 11 is placed directly over the array of emitting devices.

It should be understood that the word "light" as used in the specification and the claims of this application is not meant to signify only visible light, but does include generally all electromagnetic radiations of wavelength less than 10 microns, and specifically is defined herein to include ultraviolet and infrared light. Thus, it will be obvious to those skilled in the art that a cathode ray tube according to this invention may have a phosphor emitting both ultraviolet or UV and visible radiations, and the UV radiations may operate to darken a light sensitive layer, while the visible light is modulated by the resulting opacity and is perceived by the operator. Similar variations will likewise be obvious to those skilled in the art.

Examples of light sensitive dyes which can be used in the application include the following classes of materials:

Spiro pyrans
Xanthylidene anthrones
Fulgides
Thiaindigos
Stilbenes (such as the aromatic hydrocarbon)
Mercuric bis-dithiazonates
Leuco dyes (such as fluorescein and such as the triphenylmethane leuconitriles)

In addition to these photochromic dyes, reversible tenebrescent minerals and scotophors may be used.

Note that some chemists distinguish between photochromic, tenebrescent, and scotophor materials, largely on the basis of the patricular physical phenomena involved in the molecular structure of the matter. The terms are loosely synonymous in that all involve stable transparency, excitable coloration or opacity to some wavelength of radiant energy, and decay to the stable state with time; i.e., they are all reversible light sensitive materials.

Other materials which may be used include:

(a) Natural tenebrescent hackamites: Soda alumina silicate.

(b) Synthetic tenebrescent hackamites:

$$3(Na_2O \cdot Al_2O_3 \cdot 2SiO_2)NaCl \cdot \tfrac{1}{2}Na_2S$$

(c) Synthetic hackamite glass:

$$3(Na_2O \cdot Al_2O_3 \cdot 2SiO_2) \cdot NaCl \cdot \tfrac{1}{2}Na_2SO_4$$

(d) Photochromic silver halide glass, consisting generally of silicate glasses containing dispersed submicroscopic crystals of silver chloride, silver bromide, and/or silver fluoride. One type manufactured by Corning Glass Company has the following composition:

| | Percent |
|---|---|
| $SiO_2$ | 52.4 |
| $Na_2O$ | 1.8 |
| $LiO$ | 2.6 |
| $PbO$ | 4.8 |
| $BaO$ | 8.2 |
| $ZrO_2$ | 2.1 |
| $Al_2O_3$ | 6.9 |
| $B_2O_3$ | 20.0 |
| $Ag$ | 0.31 |
| $Br$ | 0.23 |
| $Cl$ | 0.66 |
| $CuO$ | 0.016 |

(e) Scotophors: Potassium chloride.

Reversible light sensitive materials are further described in such articles as Noyes, Hammond, and Pitts, "Advances in Photochemistry," John Wiley and Sons, 1963, pp. 275–321, or Dorian, Roth, Cox, and Stafford, "CRT Phosphor Activation of Photochromic Film," Information Display, March-April 1966, pp. 56–58.

Having described the nature of the invention, those features of novelty believed descriptive of the scope and spirit of the invention are defined with particularity in the appended claims.

What is claimed is:

1. An electronic visual display system which distinguishes to the vision of an observer between stationary and moving signals comprising in combination, an electrically controlled source of light flashes for indicating changing information patterns produced from predetermined electrical signals at progressingly different positions, a display panel presenting said light flashes and retaining the light momentarily over a visible surface area between periodically recurring cycles, and a masking layer on the panel comprising a light sensitive material substantially transparent in non-excited state at local areas in the absence of light persisting for a period longer than said cycles and relatively opaque in the excited state when light persists at local areas for several of said cycles, said material having respective excitation and decay time constants each with a duration of at least a plurality of the periods of said momentary light flash cycles, whereby individual momentary flashes at local positions are seen but that those which persist for said plurality of cycles at a particular location on said panel become at least partially masked by the opaqueness of the material in its exicited state.

2. A system as defined in claim 1 wherein the display panel is the face of a cathode ray tube, the source of light flashes is a phosphor surface on the interior of said face scanned by the cathode ray beam of said tube and the masking layer is disposed upon the exterior of said face.

3. A system as defined in claim 2 wherein the face of said tube comprises a fiber-optic panel producing discrete paths between said phosphor surface and said masking layer.

4. A system as defined in claim 1 including a detection and ranging subsystem providing said signals responsive to echoes, wherein the display panel comprises a plan position indicator device whereon static echoes are masked by said material in its excited state and moving echoes persisting at a given position for less than said plurality of cycles are visible through the transparency of said dye in its non-excited state.

5. A system as defined in claim 4 including a display generator projecting the light flashes in magnified relationship upon said display panel.

6. An electronic visual display system comprising in combination, an electrically controlled source of light flashes for indicating changing information patterns produced from predetermined electrical signals, a display panel presenting said light flashes momentarily and over a visible surface area during periodically recurring cycles, and a masking layer on the panel comprising a reversible light sensitive material substantially transparent in non-excited state and relatively opaque in the excited state, said material having respective excitation and decay time constants each with a duration of at least a plurality of the periods of said momentary light flash cycles, whereby the momentary flashes which persist for said plurality of cycles at a particular location on said panel become at least partially masked by the opaqueness of the material in its excited state, including a series of replaceable masking layers with differing materials presenting various excitation time constants, and means presenting respective layers in place upon said panel for masking respective signals with different velocity components by the different materials in their excited state.

7. A system as defined in claim 1, including radar means presenting a pattern of fixed and moving targets, whereby the temporarily opaque areas of said masking layer remove permanent obstacles to provide a historical record of recent changes in the positions at which light flashes are displayed.

8. A system as defined in claim 7 wherein the time constant of the masking layer produces an opacity of respective areas on the masking layer in an inverse function of the rate of motion of the respective exciting light flashes across said display panel, thereby to attenuate the light intensity from static flashes and to provide temporary records of the past locations and velocities of moving flashes.

9. A system as defined in claim 1 wherein the display panel is a phosphor layer within a cathode ray tube and the masking layer is disposed in substantially parallel and nearby relation to said phosphor layer.

10. A system as defined in claim 1 wherein the display panel comprises a plurality of discrete electrically energized light emitting devices arranged in a two-dimensional, ordered array.

11. A system as defined in claim 1 including a detecting and ranging subsystem providing said signals responsive to the positions of objects, wherein the display panel comprises a nominally two-dimensional representation of the position of each such object and the two dimensions represent two position parameters.

12. An electronic visual display device adapted for visual sensing by an observer of signals derived electrically from an intelligible source of changing data comprising in combination a substantially two-dimensional display surface upon which momentary flashes of light are presented periodically at local areas with changing locations and with changing intensities controlled by predetermined electrical signals, at least one masking layer having areas thereof substantially parallel and near respective areas of said display surface, said masking layer consisting of a reversible light sensitive material substantially transparent in the non-excited state at local areas where light persists for a period less than the interval between said flashes of light and relatively opaque in the excited state at local areas where said flashes of light recur periodically, said material having respective excitation and decay time characteristics such that at least a plurality of the periods of said flashes are required to respectively excite the material to maximum opacity or restore the material to transparency at particular locations on said layer, whereby the momentary flashes which occur repeatedly at associated particular locations on said surface become at least partially masked by the opaqueness of the material in its excited state.

13. The device of claim 12 wherein the substantially two-dimensional surface is the phosphor screen of a cathode ray tube.

14. The device of claim 13 wherein the phosphor screen is on the inside of the CRT faceplate, the masking layer is on the outside of said faceplate, and said faceplate consists of a fiber optics panel.

15. A device as defined in claim 12 where the time constant of said masking layer has a value producing opacity of particular areas on the masking layer which is an inverse function of the rate of motion of the respective exciting light flashes across the display surface, thereby to attenuate the intensity of static flashes and to provide a temporary record of the past location and velocity of moving flashes.

References Cited

UNITED STATES PATENTS

| | | | |
|---|---|---|---|
| 3,325,674 | 6/1967 | Kazan | 343—7.7 X |
| 3,284,652 | 11/1966 | Yaggy. | |
| 3,238,841 | 3/1966 | Bjelland et al. | 350—160 |
| 3,134,297 | 5/1964 | Carlson et al. | 350—160 |

OTHER REFERENCES

Dorion et al. "CRT Phosphor Activation of Photocromic Film," Information Display, March/April, 1966, pp. 56 to 58.

RODNEY D. BENNETT, Jr., Primary Examiner

HERBERT C. WAMSLEY, Assistant Examiner

U.S. Cl. X.R.

178—7.85; 313—92; 350—160